(12) United States Patent
Shown

(10) Patent No.: US 8,881,525 B1
(45) Date of Patent: Nov. 11, 2014

(54) HYBRID ELECTRICAL GENERATION SYSTEM

(71) Applicant: Richard Lyle Shown, Santa Rosa, CA (US)

(72) Inventor: Richard Lyle Shown, Santa Rosa, CA (US)

(*) Notice: Subject to any disclaimer, the term of this patent is extended or adjusted under 35 U.S.C. 154(b) by 0 days.

(21) Appl. No.: 14/161,637

(22) Filed: Jan. 22, 2014

Related U.S. Application Data

(60) Provisional application No. 61/841,790, filed on Jul. 1, 2013.

(51) Int. Cl.
*F03G 7/04* (2006.01)
*H02K 99/00* (2014.01)

(52) U.S. Cl.
CPC .................................. *H02K 57/003* (2013.01)
USPC .............................. 60/641.2; 290/1 R

(58) Field of Classification Search
USPC ....... 336/58; 361/695; 166/57, 302; 249/542, 249/54; 290/2, 1 R; 60/641.2
See application file for complete search history.

(56) References Cited

U.S. PATENT DOCUMENTS

| | | | | |
|---|---|---|---|---|
| 4,555,637 A * | 11/1985 | Irvine | ........................... | 290/52 |
| 4,657,290 A * | 4/1987 | Linden | ........................... | 290/2 |
| 4,740,711 A * | 4/1988 | Sato et al. | ...................... | 290/52 |
| 5,323,061 A * | 6/1994 | Immler et al. | .................. | 290/2 |
| 5,434,454 A * | 7/1995 | Farkas | ........................ | 290/4 R |
| 5,659,205 A * | 8/1997 | Weisser | ........................ | 290/52 |
| 6,011,245 A * | 1/2000 | Bell | .............................. | 219/631 |
| 6,608,393 B2 * | 8/2003 | Anderson | ..................... | 290/1 A |
| 8,305,178 B2 * | 11/2012 | Yang | ................................ | 336/58 |
| 8,395,288 B2 * | 3/2013 | Huynh | .......................... | 310/59 |
| 8,418,456 B2 * | 4/2013 | Tain et al. | ....................... | 60/531 |
| 8,536,719 B2 * | 9/2013 | Holstein et al. | ................. | 290/43 |
| 2005/0012340 A1 * | 1/2005 | Cousins | ........................ | 290/52 |
| 2005/0285458 A1 * | 12/2005 | Moeleker et al. | .............. | 310/57 |
| 2008/0178589 A1 * | 7/2008 | He et al. | ......................... | 60/531 |
| 2012/0099277 A1 * | 4/2012 | Yang | ............................... | 361/695 |

* cited by examiner

*Primary Examiner* — Thomas Denion
*Assistant Examiner* — Shafiq Mian
(74) *Attorney, Agent, or Firm* — Craig M. Stainbrook; Stainbrook & Stainbrook, LLP

(57) ABSTRACT

An electrical energy and thermal energy generation system that includes an electrical generator including a motor driving a rotor within a stator enclosed in an inner tube; a heat generating unit disposed around said inner tube enclosing said electrical generator, said heat generating unit enclosed within an outer container having walls spaced apart from said inner tube so as to define a volume through which heat exchange fluid is circulated and having a water inlet and a water outlet; an electric power supply providing power to said motor; a water supply providing unheated water to said heat generating unit through said water inlet; and a return water line through which heated water exits said water outlet for transport to a destination for use.

18 Claims, 2 Drawing Sheets

HYBRID ELECTRICAL GENERATION SYSTEM

CROSS REFERENCES TO RELATED APPLICATIONS

The present application claims the benefit of U.S. Provisional Patent Application Ser. No. 61/841,790, filed Jul. 1, 2013.

SEQUENCE LISTING

Not applicable.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE OF MATERIAL SUBMITTED ON A COMPACT DISC

Not applicable.

BACKGROUND OF THE INVENTION

Field of the Invention

The present invention relates generally to a hybrid system for the generating electrical power and for supplementing heat energy found at depth within the earth so as to develop and harvest useful energy for practical applications.

BRIEF SUMMARY OF THE INVENTION

The present invention is intended to generate electrical energy directly, in the form of either alternating current or direct current. This generation of electrical energy will take place in a specially designed unit placed in the upper (near surface) of the mantle of the Earth, in that region commonly referred to as the crust. The generation of the electrical energy will produce heat energy as a by-product and, when combined with the inherent heat energy generated by the electromagnetic field in the Earth, will produce a heat current, or "load," which will lessen the efficiency of the electrical generator, if not dissipated. To reduce the combined heat "load" of the in-ground (inherent heat), and the heat energy by-product of the electrical generation, a subsidiary system will be employed to utilize the resulting heat energy.

The electrical generating unit described above is not a new or unique departure from the current technology of electrical generators, but clearly a design of such a unit which will fit into the heat transfer cylinder, or capsule, of the present invention. However, the electrical generating unit must be designed to operate in an enclosed space, which will efficiently and economically transfer the heat generated by the electrical unit swiftly and nearly complete into the adjacent heat transfer, or expansion cylinder. The rotation of the electrical generating unit's rotor will be powered by a direct current electric motor situated on the top of unit and connected with the rotor by a fitted spline with the rotor itself. The speed of rotation of the rotor will be controlled to generate a desired level of the electromotive force. The rotor will be magnetized independently and permanently. Any additional magnetization by the ambient electromagnetic field will simply increase and supplement the infused magnetism of the rotor core by design.

BRIEF DESCRIPTION OF SEVERAL VIEWS OF THE DRAWINGS

The invention will be better understood and objects other than those set forth above will become apparent when consideration is given to the following detailed description thereof. Such description makes reference to the annexed drawings wherein.

DESCRIPTION OF THE INVENTION

Figure 1:
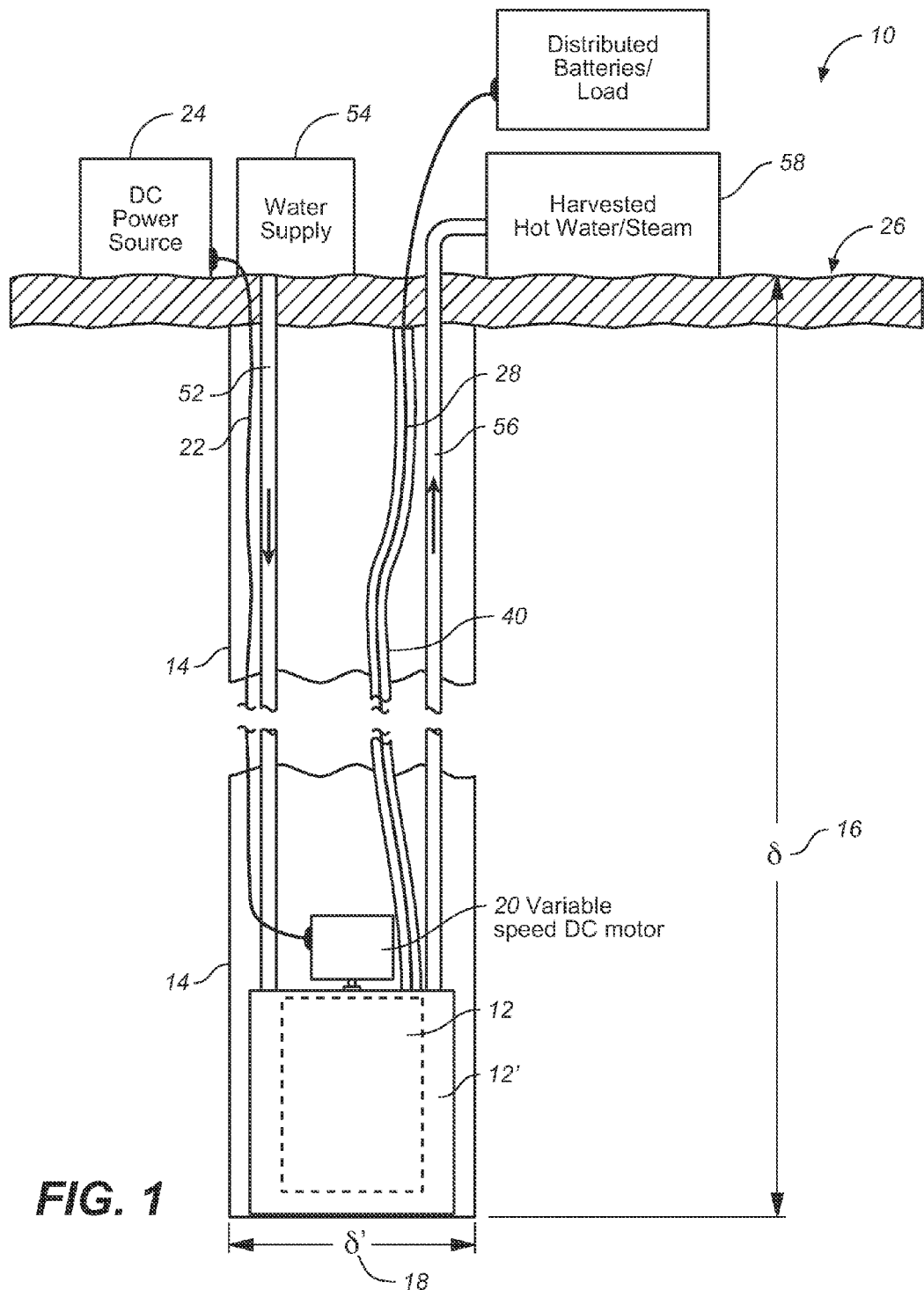
FIG. 1 is a highly schematic side view in elevation of the system of the present invention, showing the structural and operational elements installed in a bore hole in the Earth.
Figure 2:
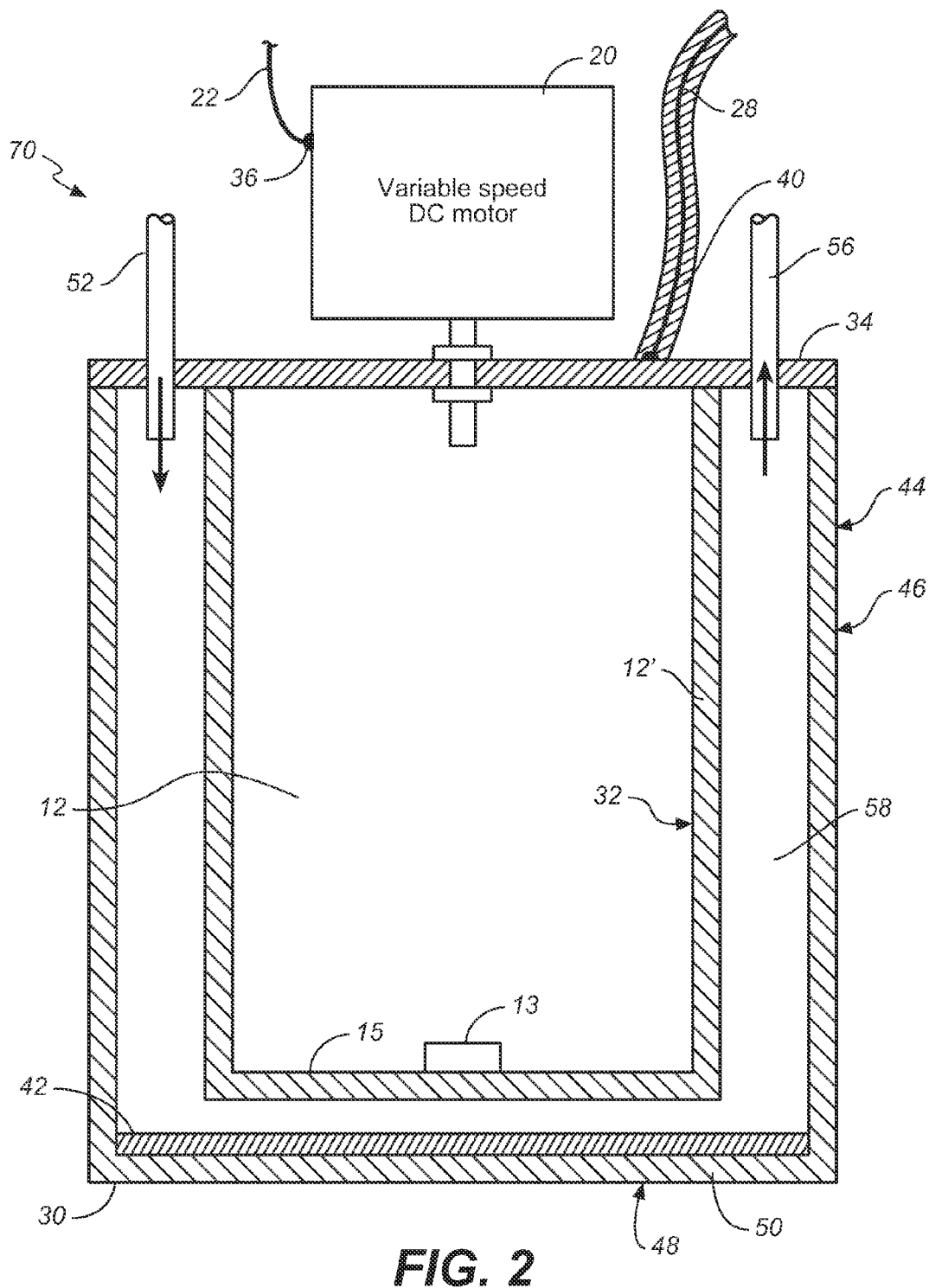
FIG. 2 is a highly schematic cross-sectional side view in elevation of the electrical generation unit, generator motor, and heat exchange unit of the present invention.

Referring to FIGS. 1 and 2, wherein like reference numerals refer to like components in the various views, there is illustrated therein a new and improved electrical energy and thermal energy generation system, generally denominated 10 herein.

The electrical generation unit 12 is disposed in a bore hole 14 of sufficient dimensions for the operation of the entire unit. The depth 16 of the hole will range from 200 to 600 meters. In a system including a number of operative units, each hole will be designed to avoid ambient groundwater. The diameter 18 of the drilled hole will be at least 450 mm. The electrical generating unit will be approximately 400 mm in diameter.

The electrical generating unit employs a variable speed direct current motor 20 preferably designed to generate 75 KW-100 KW and will be 2 meters in height. The stator of the electrical generating unit motor 20 is mounted and disposed in a vertical orientation. The diameter of the rotor does not exceed 100 mm and is installed vertically. In a preferred embodiment, the motor is a 3-shaft horsepower (SHp) direct current motor with power leads to the surface. The size and power specifications of the direct current motor 20 depend upon an engineering analysis of the most efficient motor needed. A tapered roller-bearing surface 13 is supplied at the base 15 of the 2 meter electrical generator housing 12' to support the rotor in its rotation. The variable speed rotor-motor 20 is provided with direct current through a power line 22 from a power supply 24 on the surface 26.

Control of the direct current motor 20 is provided by a standard direct current rpm device in order to maintain the rotation of the rotor to supply at 60 cycles per second (where that frequency is mandated) and a different frequency for other parts of the world. The rate of speed of the rotor is informed by the design to match the speed standard for the market in which it is placed. At the top of the rotor, the axis of the rotor is supported by a tapered bearing surface for the efficient operation of the rotor in the generator.

The power generated by the generator is transmitted to the surface by a 3-phase system of wiring 28. From there it will be combined with other generation units (in-phase).

The above described electrical generating unit is preferably encased in a double-walled housing 70 comprising a stainless steel inner tube 12' spaced apart from a stainless steel outer container 30. The stainless steel inner tube 12' within which the electrical generating unit is contained is preferably itself a watertight double-walled vessel and shall not leak heat-transfer water at any point into the generating unit interior. Further, the interior surface 32 of the stainless steel inner tube 12' encasing the electrical generating unit is covered with a black iron-oxide coating. The same coating may be applied to any or all of the interior and exterior surfaces of the inner tube and the outer container. The coating is fired in a furnace to ensure permanent adhesion to any surface to which it is applied. The top 34 of the stainless steel inner tube 12' and the stainless steel outer container 30 is also stainless steel.

The top 34 shall include one or more electrical connectors 36, 38 is disposed on the motor 20 to transmit the direct current to the motor and on the generating unit to transmit electrical energy produced by the unit to the surface. The connectors are completely water tight and electrically secure. The electrical wires 28 extending from the components in the bore hole to the surface shall also be encased in a stainless steel tube 40 extending all the way to the surface where it can be insulated and properly distributed.

The heat generating unit includes the electrical generating unit disposed in the inner tube as well as the outer container. Together, with other operational elements, the inner tube and outer container define a space through which water, as a heat exchange fluid, is circulated. In the bottom of the outer container 30, there is placed a stainless steel plate 42 of approximately 390 mm in diameter (with close tolerances in relation to the interior diameter of the heat-generating unit). The thickness is 50 mm in thickness.

The exterior surface 44 of the stainless steel outer container 30 has a black iron oxide coating. The same is true for the exterior surface 48 of the bottom 50. The black iron oxide coating significantly increases the rate of heat energy radiation into the double-walled chamber. This coating is fired in a furnace to guarantee permanent adhesion to the exterior of the generating tube. This iron oxide coating shall cover the complete exterior of the heat generating unit.

Demineralized water is provided through tubing 52 extending from a water source 54 located on the surface and returned to the surface by separate tubing 56. The heat energy extracted from the electrical generating unit and transferred to the water circulating through the space 58 between the inner tube and the outer container may then be utilized at the surface for a multitude of purposes for human use. This will increase the output of the heat exchange component of the unit while increasing the efficiency of the electrical generating unit. The reduction of the heat load on the electrical generating unit will further increase the efficiency of the entire unit. The connection to the surface of the heat generating and heat dissipating unit is contained in a separate stainless steel transmission tube 56, which is insulated from both the down-flow tube and the output tubes of the low-pressure steam.

The tube 52 for the injection of demineralized water may be only 25 mm in diameter; the tube or tubes 56 that carry the steam to the surface may only be 10-15 mm in diameter and are collated in the insulated jacket to conserve the heat energy being transmitted. When the steam tubes reach the surface, they can be combined in a manifold or other storage reservoir 58 to be transmitted to other devices. If the devices require steam pressure of higher velocity, then the use of fossil fuels to increase their steam pressure may be utilized for the generation of electrical energy for conventional surface generators. The energy of conventional fossil fuels will therefore be conserved by utilizing this technology. Thus, the world supply of conventional fossil fuels will be extended well beyond the currently programmed dissipation of those fuels under current practices.

Electrical power generated in the unit will be delivered to distribution lines for immediate distribution and use or to a battery supply for storage and later use.

The energy of conventional fossil fuels will therefore be conserved by utilizing this technology. Thus, the world supply of conventional fossil fuels will be extended well beyond the currently programmed dissipation of those fuels under current practices.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. An electrical energy and thermal energy generation system, comprising:
   an electrical generator including a motor driving a rotor within a stator enclosed in an inner tube;
   a heat generating unit disposed around said inner tube enclosing said electrical generator, said heat generating unit enclosed within an outer container having walls spaced apart from said inner tube so as to define a volume through which heat exchange fluid is circulated and having a water inlet and a water outlet;
   an electric power supply providing power to said motor;
   a water supply providing unheated water to said heat generating unit through said water inlet; and
   a return water line through which heated water exits said water outlet for transport to a destination for use.

2. The electrical energy and thermal energy generation system of claim 1, wherein said electrical generating unit and said heat generated unit are disposed in a bore hole in the earth, said bore hole ranging from 200 to 600 meters and at least 450 mm in diameter.

3. The electrical energy and thermal energy generation system of claim 1, wherein said outer container is double-walled stainless steel.

4. The electrical energy and thermal energy generation system of claim 1, wherein said inner tube is double-walled stainless steel.

5. The electrical energy and thermal energy generation system of claim 1, wherein the inner tube has an interior surface coated with black iron oxide.

6. The electrical energy and thermal energy generation system of claim 1, wherein the interior surface of said outer container is coated with black iron oxide.

7. The electrical energy and thermal energy generation system of claim 1, wherein substantially all of the surfaces of said inner tube and said outer container are coated with black iron oxide.

8. The electrical energy and thermal energy generation system of claim 1, wherein said inner tube and said outer container share an upper top.

9. The electrical energy and thermal energy generation system of claim 1, wherein said inner tube and said outer container and both cylindrical and are substantially coaxially disposed.

10. The electrical energy and thermal energy generation system of claim 1, wherein said inner tube includes a top having at least one electrical connector to which to connect wires to transmit electrical energy produced by said electrical generator to the surface.

11. The electrical energy and thermal energy generation system of claim 1, wherein said wires are encased in a stainless steel tube extending from said electrical generator to the surface.

12. The electrical energy and thermal energy generation system of claim 1, wherein said heat generating unit includes said electrical generating unit and said outer container.

13. The electrical energy and thermal energy generation system of claim 1, wherein said outer container includes a stainless steel plate.

14. The electrical energy and thermal energy generation system of claim 1, wherein heat energy is extracted from said electrical generator unit and transferred to water circulating through the space between said inner tube and said outer container.

15. The electrical energy and thermal energy generation system of claim 1, wherein said outer container is approximately 400 mm in diameter and approximately 2 meters in height.

16. The electrical energy and thermal energy generation system of claim 1, wherein said electrical generating unit generates 75 KW-100 KW.

17. The electrical energy and thermal energy generation system of claim 1, wherein said electrical generator includes a stator disposed in a vertical orientation.

18. The electrical energy and thermal energy generation system of claim 1, wherein said rotor has a diameter not exceeding 100 mm.

* * * * *